(12) United States Patent
Nagatsuka

(10) Patent No.: US 6,468,096 B1
(45) Date of Patent: Oct. 22, 2002

(54) ROTATING BEARING DEVICE, JOINT DEVICE, WIRING DEVICE OF JOINT MECHANISM, AND ROBOT

(75) Inventor: Masaki Nagatsuka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/646,488

(22) PCT Filed: Jan. 21, 2000

(86) PCT No.: PCT/JP00/00289

§ 371 (c)(1),
(2), (4) Date: Sep. 19, 2000

(87) PCT Pub. No.: WO00/43169

PCT Pub. Date: Jul. 27, 2000

(30) Foreign Application Priority Data

Jan. 21, 1999  (JP) .......................................... 11-012988

(51) Int. Cl.[7] ............................................... H01R 3/00
(52) U.S. Cl. ....................................................... 439/164
(58) Field of Search .................................. 439/363, 448, 439/164, 165

(56) References Cited

U.S. PATENT DOCUMENTS 2,119,168 A * 5/1938 Kus ........................... 439/164
3,599,165 A * 8/1971 Wendell et al. ............. 439/164
3,768,325 A * 10/1973 Kuncharski, Jr. ............ 74/405
4,906,121 A   3/1990 Torii et al. .................... 403/78
5,829,148 A * 11/1998 Eaton ........................... 33/503
6,220,889 B1 * 4/2001 Ely et al. .................... 439/446

FOREIGN PATENT DOCUMENTS

| JP | 62-136392 | 6/1987 |
| JP | 3-50965 | 5/1991 |
| WO | WO 87/03529 | 6/1987 |

* cited by examiner

*Primary Examiner*—Tho D. Ta
*Assistant Examiner*—James R. Harvey
(74) *Attorney, Agent, or Firm*—Frommer Lawrence & Haug LLP; William S. Frommer; Matthew K. Ryan

(57) ABSTRACT

It is possible to realize a rotary bearing device, an joint device, a wiring device for joint mechanism and a robot which facilitate wiring, which have aesthetic appearances and are capable of prolonging a service life of a wiring material by forming a concave groove in a portion of an outer circumference of a rotating shaft used at a center of an joint along an axial direction and laying a cable having a pair of connectors preliminarily connected to both ends in the concave groove along an axial direction.

9 Claims, 11 Drawing Sheets

ROTATING BEARING DEVICE, JOINT DEVICE, WIRING DEVICE OF JOINT MECHANISM, AND ROBOT

TECHNICAL FIELD

The present invention relates to a rotary bearing device, an joint device, a wiring device for joint mechanism and a robot, and is preferably applicable, for example, to a gressorial robot.

BACKGROUND ART

There has been developed a small gressorial robot which has a form like that of man or an animal and can walk with two or four walking leg members. Such a wiring device as shown in FIGS. 7 and 8, for example, is adopted in an joint mechanism of a leg member of such a kind of gressorial robot.

That is a conventional joint mechanism 51 shown in FIGS. 8 and 9 comprises a leg member 53 which is coupled with a leg attaching member 52 so that the leg member 53 is rotatable around two perpendicularly intersecting rotating shafts 54 and 55 disposed at a center of an joint. In this joint mechanism, the two rotating shafts 54 and 55 are rotatably attached to the leg attaching member 52 and the leg member 53 by way of a pair of radial bearings 56 and 57 respectively which are ball bearings or the like, and partial gears 58 and 59 are formed integrally with outer circumferences of intermediate portions of the rotating shafts 54 and 55. A shaft fitting member 60 formed integrally with a tooth-lack portion which is a portion of an outer circumference of the partial gear 59 on a side of the leg member 53 is detachably fitted over a tip 54a of the rotating shaft 54 on a side of the leg attaching member 52 in an axial direction, and the shaft fitting member 60 and the tip 54a are detachably coupled at their centers with a screw 61 which runs in a direction perpendicular to the axial direction. The leg member 53 can be rotatingly driven relative to the leg attaching member 52 around the two rotating shafts 54 and 55 within a definite angle by rotatingly driving the partial gears 58 and 59 of the two rotating shafts 54 and 55 independently with a driving gear 63 of an actuator 62 such as a geared motor or the like attached to the leg attaching member 52 and the leg member 53 respectively (see FIG. 11).

At a stage to electrically connect a pair of control circuits (not shown) which are built in the leg attaching member 52 and the leg member 53 respectively with a cable 64 used as a wiring material, a wiring device for the joint mechanism 51 shown in FIG. 8 allows the cable 64 to be laid so that it is exposed outside the joint mechanism 51 by detachably connecting a pair of connectors 65 and 66 which are preliminarily connected to both ends of the cable 64 to the pair of control circuits.

On the other hand, a wiring device for the joint mechanism 51 shown in FIGS. 9 through 11 uses hollow shafts as the two rotating shafts 54 and 55, and allows the cable 64 to be inserted through and along center slots 67 and 68 of the rotating shafts 54 and 55. Since the cable 64 is inserted through the center slots 67 and 68 of the rotating shafts 54 and 55 in this case, the screw 61 cannot run through the center of the rotating shaft 54 to attach the shaft fitting member 60 to the tip 54a of the rotating shaft 54 and it is necessary to tighten the shaft fitting member 60 to both sides of the rotating shaft 54 using a pair of screws 61.

The wiring device shown in FIG. 8 allows an angle sensor 68 or the like to be attached coaxially with a playing end 54b of the rotating shaft 54 (and the rotating shaft 55) to configure the joint mechanism 51 as a whole compact since the cable 64 is not inserted through the rotating shafts 54 and 55, whereas the cable 64 which is exposed outside the joint mechanism 51 degrades an aesthetic appearance. The cable 64 must have a large margin in its length in order to reserve a large movable range for the leg member 53 and therefore poses a problem that the cable 64 is liable to twist around another part during a movement of the leg member 53 and is easily broken.

Furthermore, the wiring device shown in FIGS. 9 through 11 does not allow the cable 64 to be exposed outside the joint mechanism 51 since the cable 64 is inserted through and along the center slots 67 and 68 of the rotating shafts 54 and 55, whereas the wiring device makes it impossible to attach the angle sensor or the like coaxially to the end 54b of the rotating shaft 54 (and the rotating shaft 55). Since the connectors 65 and 66 have an outside diameter which is generally larger than that of the cable 64, the connectors 65 and 66 cannot pass through the center slots 67 and 68 when a small joint mechanism 51 must use the rotating shafts 54 and 55 which have so small a diameter as not to permit forming the center slots 67 and 68 larger than the outside diameter of the connectors 65 and 66, whereby the wiring device cannot use the cable 64 which has the pair of connectors 65 and 66 preliminarily connected to both ends as shown in FIG. 7 and requires soldering either of the connectors 65 and 66 to the end of the cable 64 or soldering the ends of the cable 64 directly to the control circuits after passing only the cable 64 through and along the center slots 67 and 68, thereby remarkably complicating a wiring work. Moreover, since both the ends of the cable 64 which is laid in and along the center slots 67 and 68 are fixed with the connectors 65, 66, etc. and a rotation of the cable 64 is limited in the center slots 67 and 68, the wiring device poses a problem that the cable 64 is liable to be injured and its service life is shortened due to rubbing and twisting in the center slots 67 and 68 during rotations of the rotating shafts 54 and 55.

DISCLOSURE OF THE INVENTION

The present invention has been achieved in view of the points described above to propose a rotary bearing device, a joint device, a wiring device for joint mechanism and a robot which are configured to facilitate wiring, improve aesthetic appearances and prolong a service life of a wiring material.

In order to solve such a problem, the present invention provides a rotary bearing device consisting of at least a rotating shaft and a bearing for holding the rotary shaft, wherein a concave groove is formed in a portion of an outer circumference of the rotating shaft along an axial direction of the rotating shaft.

As a result, the rotary bearing device allows a wiring material to be laid in the concave groove formed in the portion of the outer circumference of the rotating shaft along the axial direction, thereby making it possible to easily lay even a wiring material which has connectors connected to both ends in and along the concave groove of the rotating shaft without exposing the wiring material outside the joint mechanism. Since the rotary bearing device allows even the material which has the connectors connected to both the ends to be easily laid in and along the concave groove of the rotating shaft without being exposed outside the joint mechanism, the rotary bearing device can have an improved aesthetic appearance and prevent the wiring material from being twisted or rubbed, thereby remarkably prolonging a service life of a cable.

Furthermore, the present invention provides an joint device using a rotating shaft and a bearing for holding the rotating shaft, wherein a concave groove is formed in a portion of an outer circumference of the rotating shaft along an axial direction of the rotating shaft.

As a result, the joint device allows a wiring material to be laid in the concave groove formed in the portion of the outer circumference of the rotating shaft along the axial direction, thereby making it possible to easily lay even a wiring material which has connectors connected to both ends in and along the concave groove of the rotating shaft without exposing any wiring material outside the joint mechanism. Since the joint mechanism allows even the wiring material which has connectors connected to both ends to be easily laid in and along the concave groove of the rotating shaft without being exposed outside the joint device, the joint device can have an improved aesthetic appearance and prevent the wiring material from being twisted or rubbed, thereby remarkably prolonging a service life of a cable.

Furthermore, the present invention provides an joint device using a rotating shaft, wherein a concave groove is formed in a portion of the outer circumference of rotating shaft along an axial direction of the rotating shaft, a wiring material is laid in and along the concave groove of the rotating shaft, and the wiring material is located in the concave groove with a ring like member fitted over the outer circumference of the rotating shaft.

As a result, this joint device allows even a wiring material which has connectors connected to both ends to be easily laid in the concave groove of the rotating shaft without being exposed outside the joint device, thereby not only having an improved aesthetic appearance and being capable of remarkably prolonging a service life of a cable by preventing the wiring material from being twisted or rubbed but also being capable of preventing the wiring material from springing out of the concave groove by locating the wiring material in the concave groove with the ring like member fitted over the outer circumference of the rotating shaft to make it possible to lay the wiring material within a minimum space, prevent the wiring material from springing out of the concave groove during rotation of the rotating shaft and securely maintain stability of the wiring material.

Furthermore, the present invention provides an joint device which uses a rotating shaft and a bearing having an inner ring for supporting an outer circumference of the rotating shaft, in which a concave groove is formed in a portion of the outer circumference of the rotating shaft along an axial direction of the rotating shaft, a wiring material is laid in and along the concave groove of the rotating shaft and the wiring material is located in the concave groove with the inner ring of the bearing fitted over the outer circumference of the rotating shaft.

As a result, this joint device allows the bearing to function also as means in particular for preventing the wiring material from springing out of the concave groove of the rotating shaft, thereby making it possible to reduce the number of parts and the number of assembling steps. Moreover, the joint device allows the inner ring of the bearing which prevents the wiring material from springing out of the concave groove to be rotated together with the rotating shaft, thereby being capable of preventing a risk of the wiring material from being rubbed and injured by the inner ring during rotation of the rotating shaft and remarkably prolonging a service life of the wiring material.

Furthermore, the present invention provides an joint device using a rotating shaft and is configured by laying a wiring material having a pair of connectors connected to both ends along an axial direction of the rotating shaft, wherein a concave groove is formed in a portion of an outer circumference of the rotating shaft in the axial direction of the rotating shaft, the wiring material is laid along the concave groove of the rotating shaft in a condition where one of the connectors of the wiring material is inserted through a center hole of a ring like member and the wiring material is located in the concave groove by fitting the ring like member over the outer circumference of the rotating shaft.

As a result, this joint device allows the wiring material to be easily laid in the concave groove formed in the portion of the outer circumference of the rotating shaft along the axial direction in a condition where the connectors are preliminarily connected to both the ends of the wiring material so far as the connectors have a size which can be inserted through the center hole of the ring like member. Accordingly, the joint device makes it possible to eliminate tedious procedures of connecting the connectors to the ends of the wiring material after laying the wiring material, thereby remarkably facilitating the wiring work.

Furthermore, the present invention provides a wiring device for joint mechanism which uses a rotating shaft, a gear formed at an end of the rotating shaft and an inner ring of a bearing for supporting an outer circumference of the rotating shaft, wherein an L shaped concave groove is composed of a first concave groove formed in a portion of the outer circumference of the rotating shaft along an axial direction of the rotating shaft and a second concave groove formed in a radial shape which is connected to an end of the first concave groove and ranges from a side surface of the gear to an outer circumference of the gear, a wiring material is laid in and along the L shaped concave groove and the wiring material is located in the L shaped concave groove with the inner ring of the bearing fitted over the outer circumference of the rotating shaft.

As a result, this wiring device for joint mechanism allows the wiring material to be laid within a minimum space and allows the inner ring of the bearing which prevents the wiring material from springing out of the L shaped concave groove to be rotated together with the rotating shaft, thereby making it possible to prevent the wiring material from being rubbed and injured by the inner ring during rotation of the rotating shaft, and remarkably prolong a service life of the wiring material. Since the wiring device for joint mechanism requires only formation of the outer concave groove in the portion of the outer circumference of the rotating shaft and eliminates a necessity to use a hollow shaft having low strength as the rotating shaft, the wiring device for joint mechanism makes it possible to reserve sufficient strength for the rotating shaft and obtain a durable joint mechanism. Since the wiring material is not inserted through a center of the rotating shaft, an angle sensor or the like can be attached coaxially to an end of the rotating shaft, thereby making it possible to configure the joint mechanism compact.

Furthermore, the present invention provides a robot which uses, in an joint part of a body, a rotary bearing device according to claim 1 or claim 2, an joint device according to claim 3, claim 4, claim 5, claim 6, or claim 7, or a wiring device for joint mechanism according to claim 8 or claim 9.

As a result, this robot has a wiring material not exposed outside joints of leg members, an improved aesthetic appearance, compact joints and remarkably miniatured design.

BEST MODE FOR CARRYING OUT OF THE INVENTION

An embodiment of the present invention will be detailed below with reference to the accompanying drawings.

Figure 7:
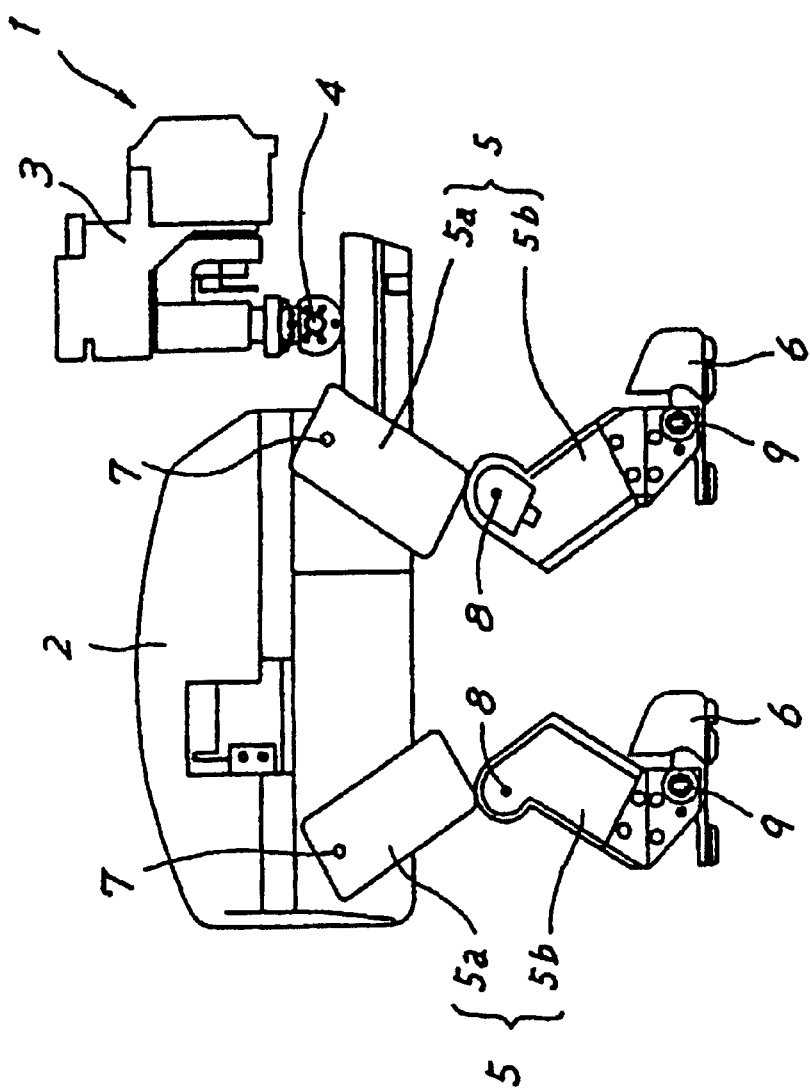
FIG. 7 is a side view of the gressorial robot as a whole shown in FIG. 4.
Figure 8:
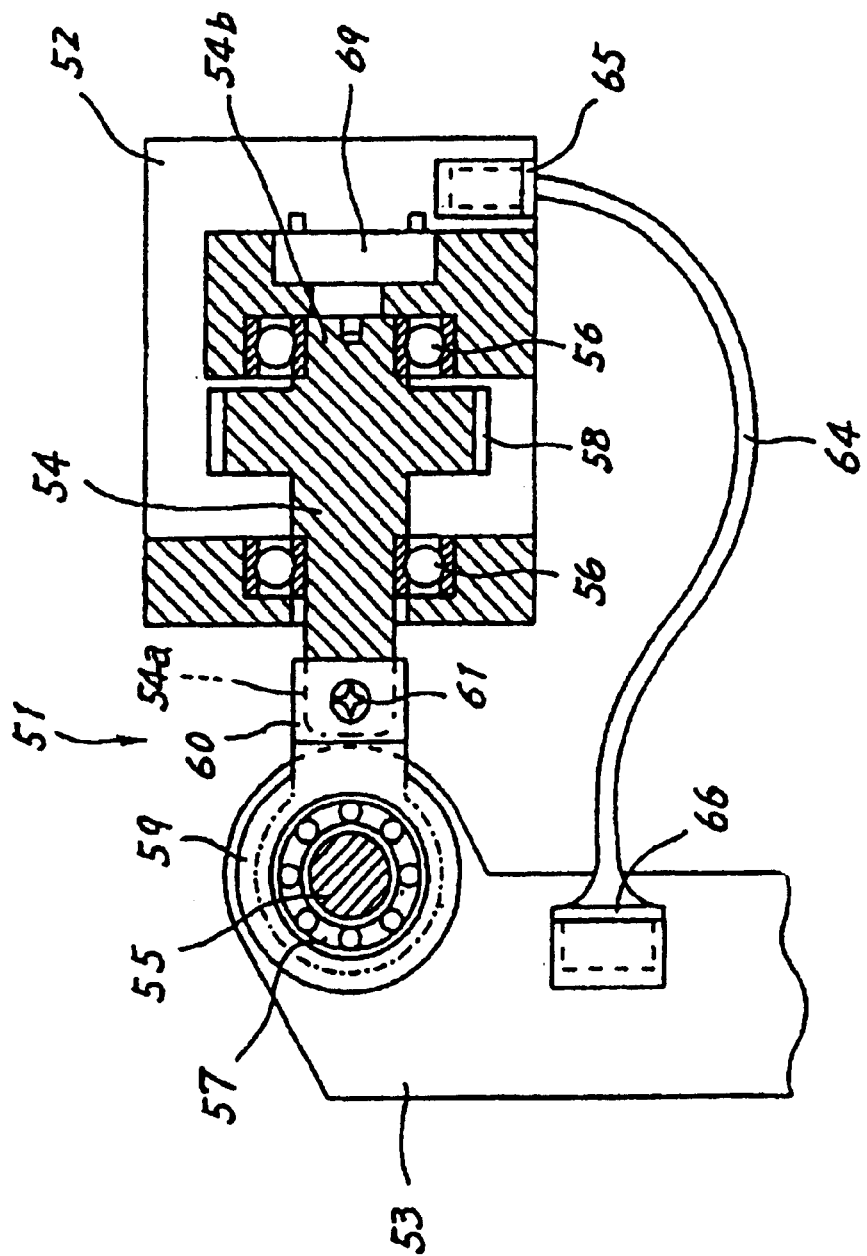
FIG. 8 is a partially cut side view descriptive of an example of a conventional wiring device for joint mechanism.
Figure 9:
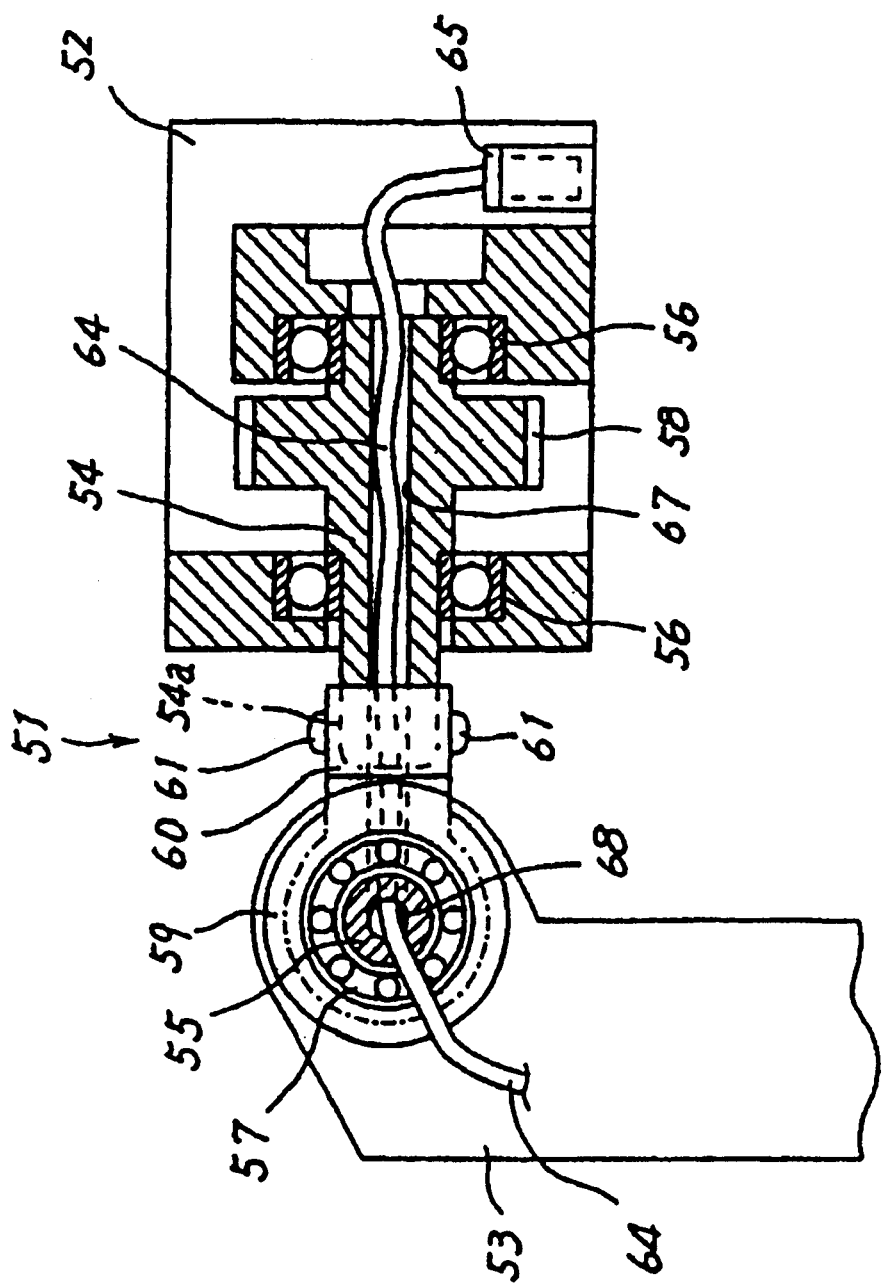
FIG. 9 is a partially cut side view descriptive of another example of the conventional wiring device for joint mechanism.
Figure 10:
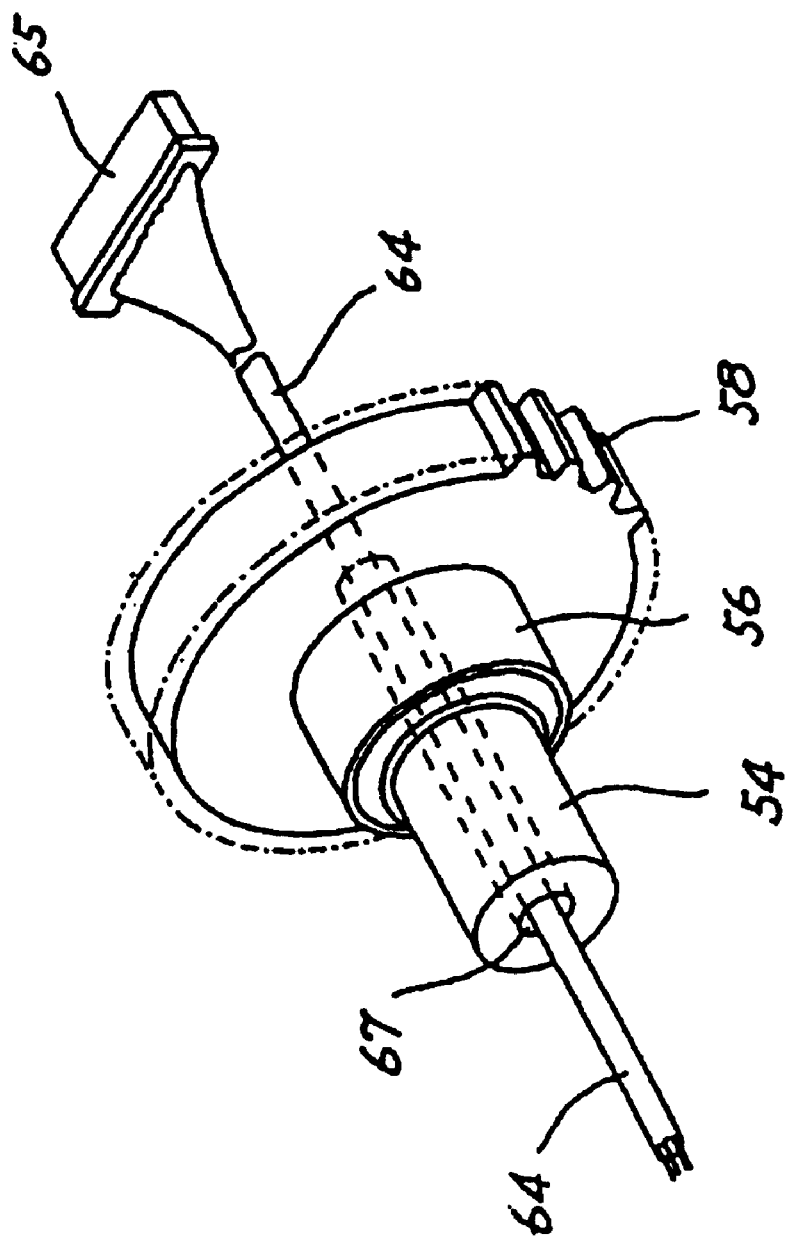
FIG. 10 is a perspective view of main parts of FIG. 9.
Figure 11:
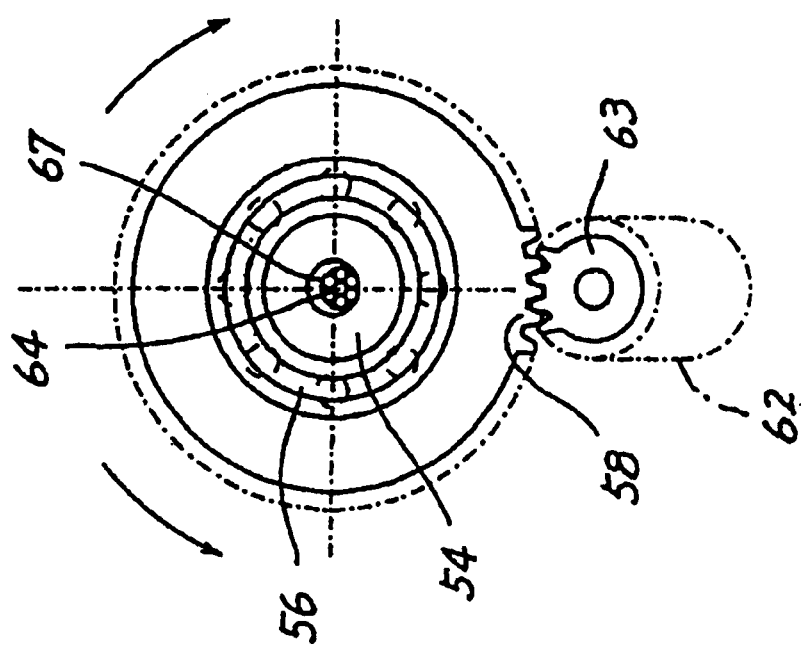
FIG. 11 is a front view of FIG. 10.

First, FIG. 7 shows a compact gressorial robot as an example of robot, and this gressorial robot 1 is configured as an imitation of a four-footed animal, for example a dog or a cat, having a head member 3 which is mounted over a front end of a body member 2 by way of a neck joint 4 so as to be rotatable in two directions of up-down and right-left. A total of four walking leg members 5 and grounding leg members 6 are attached to two portions on both right and left sides of the body member 2. Each leg member 5 is configured by an upper leg part 5a and a lower leg part 5b, and each upper leg part 5a is attached to a side surface of the body member 2 with a shoulder joint 7 so as to be rotatable in two front-rear and right-left directions. An upper end of each lower leg part 5b is attached to a lower end of each upper leg part 5a by way of a knee joint 8 so as to be rotatable in the front-rear direction and each foot member 6 is attached to a lower end of each lower leg part 5b by way of an ankle joint 9 so as to be rotatable in the up-down direction.

Figure 6:
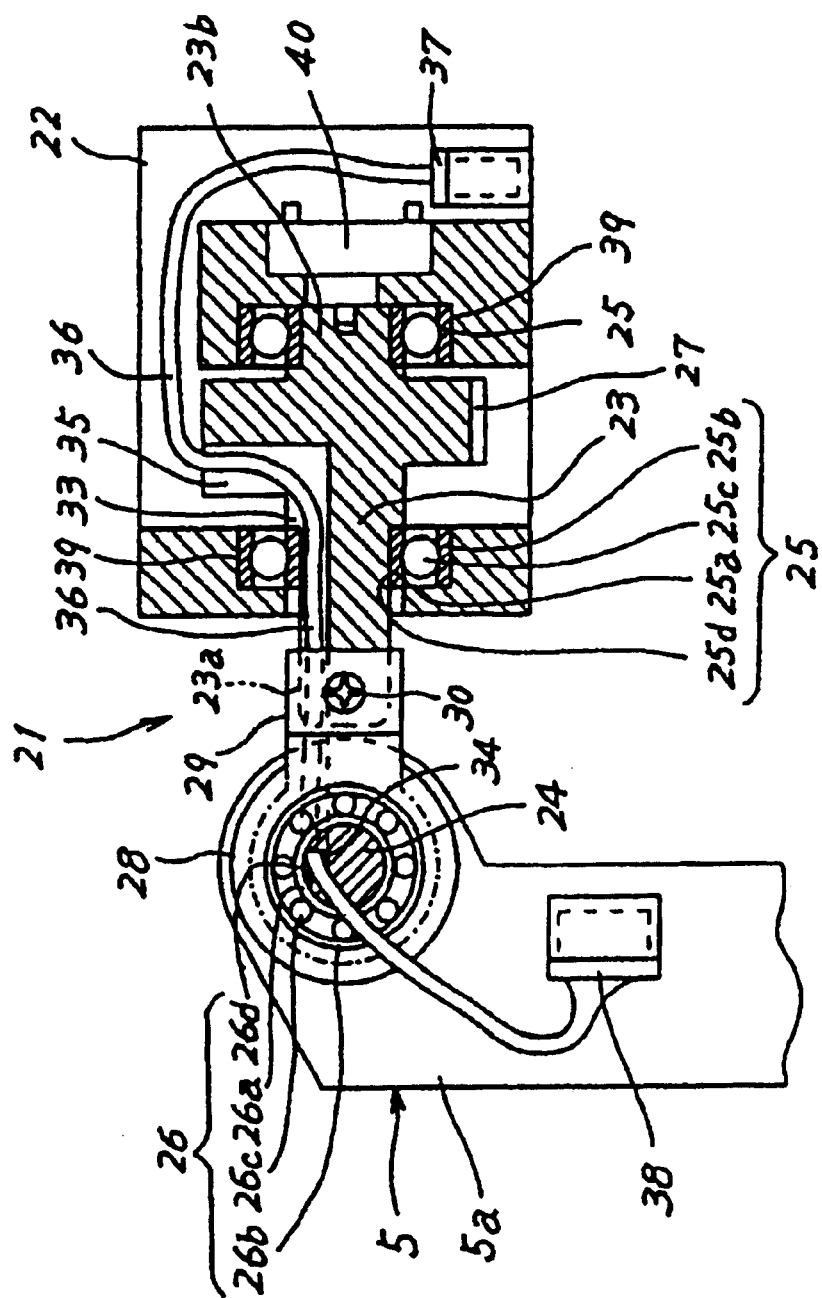
FIG. 6 is a partially cut side view descriptive of the wiring device for joint mechanism as a whole of the leg member of the gressorial robot shown in FIG. 4.

Only each ankle joint 9 is configured as freely rotatable structure which has no actuator (driving mechanism), whereas actuators are built in other joints, that is, the neck joint 4, each shoulder joint 7 and each knee joint 8 respectively. Accordingly, the robot 1 is configured so as to be capable of not only swinging the head member 3 relative to the body member 2 around the neck joint 4 in the two up-down and right-left directions but also walking by itself to advance or retreat the body member 2 while performing walking movements with the upper leg parts 5a and the lower leg parts 5b of the four leg members or moving these leg parts in the front-rear direction around each shoulder joint 7 and each knee joint 8 as shown in FIG. 6. In addition, the robot 1 is capable of swinging one of the four leg members 5 in the right-left direction around the shoulder joint 7.

Figure 1:
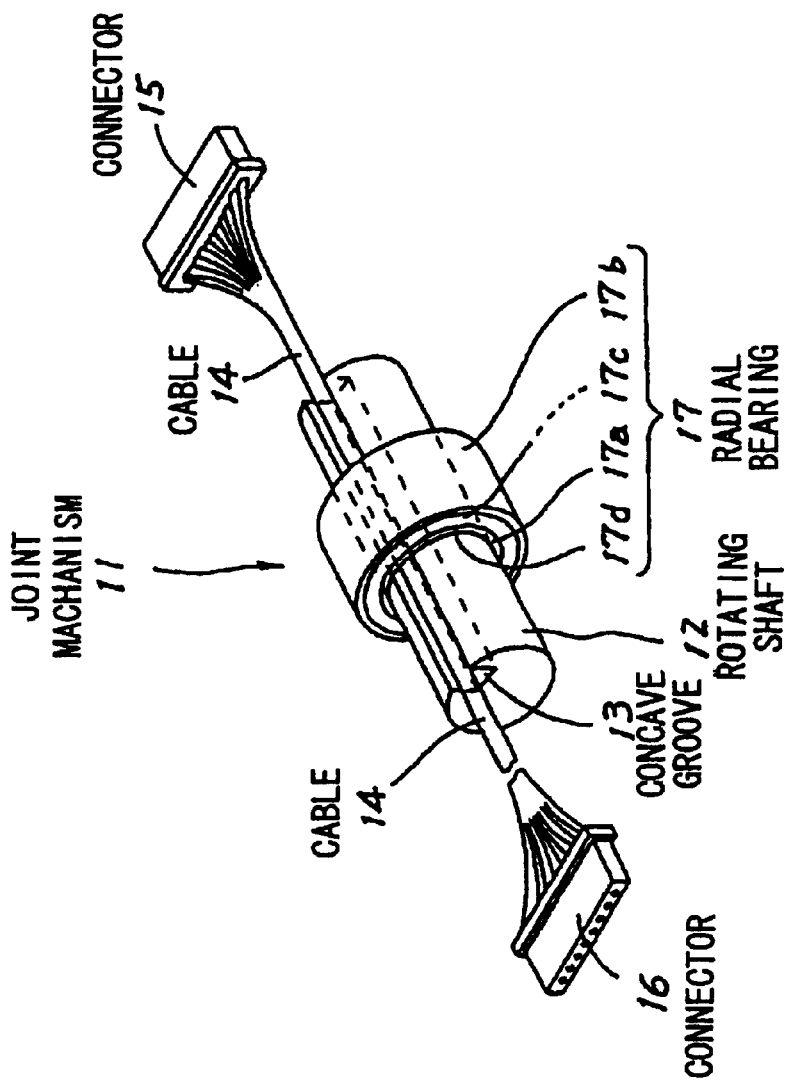
FIG. 1 is a perspective view descriptive of a principle of a wiring device for joint mechanism to which the present invention is applied.
Figure 2:
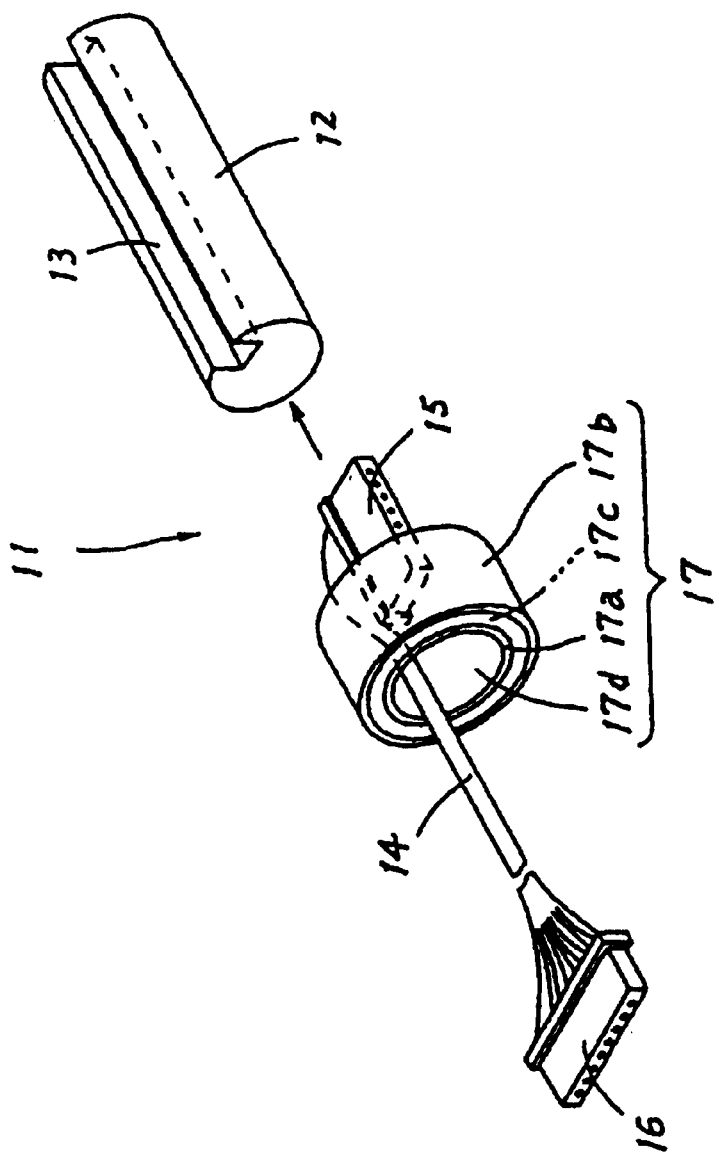
FIG. 2 is an exploded perspective view of FIG. 1.
Figure 3:
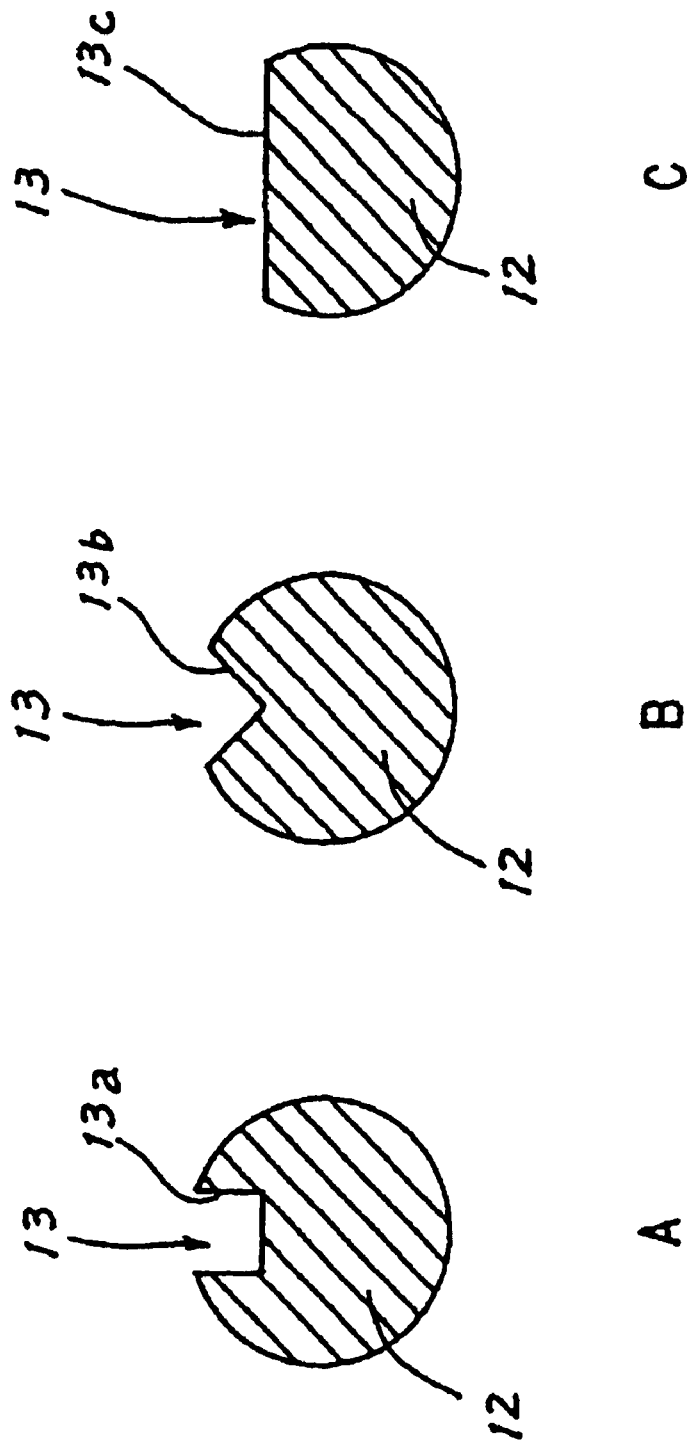
FIG. 3 is a sheared sectional view of a rotating shaft descriptive of examples of a shape of a concave groove.

In FIGS. 1 through 3 descriptive of a principle of a wiring device for an joint mechanism 11 according to the present invention, a concave groove 13 is formed in a portion of an outer circumference of a rotating shaft 12 which is used at a center of an joint along an axial direction of the rotating shaft 12. A pair of connectors 15 and 16 are preliminarily connected to both ends of a cable 14 which is an example of wiring material. Used as a bearing for the rotating shaft 12 is a radial bearing 17 such as a ball bearing which uses a plurality of rotors 17c interposed between an inner ring 17a and an outer ring 17b. In addition, various shapes such as a U groove 13a shown in FIG. 3A, a V groove 13b shown in FIG. 3B and a flat cut surface 13c parallel to a tangent direction relative to the outer circumference of the rotating shaft 12 shown in FIG. 3C may be adopted for the concave groove 13, and the concave groove 13 may be formed in parallel with a center of the rotating shaft 12 or in a radial shape along the outer circumference of the rotating shaft 12.

At a wiring stage as shown in FIG. 2, the cable 14 is first inserted through a center slot 17d inside the inner ring 17a of the radial bearing 17 so as to pass either of the connectors 15 and 16 at both the ends of the cable 14 through the center slot 17d. Then, as shown in FIG. 1, the cable 14 is laid in the axial direction in and along the concave groove 13 of the outer circumference of the rotating shaft 12, and the inner ring 17a of the radial bearing 17 is fitted pressedly over the outer circumference of the rotating shaft 12. The rotating shaft 12 is rotatably set by supporting the outer ring 17b of the radial bearing 17 with a supporting member (not shown).

This wiring device for the joint mechanism 11 allows the center slot 17d of the radial bearing 17 to be configured so as to have a diameter which is equal to or larger than a diameter of the rotating shaft 12, thereby making it possible to easily pass the connectors 15 and 16 at both the ends of the cable 14 through the center slot 17d. Since the cable 14 can be easily fitted and laid into the concave groove 13 of the outer circumference of the rotating shaft 12 after the cable 14 has been inserted through the radial bearing 17, the wiring device for the joint mechanism 11 makes it possible to easily lay the cable 14 which has the connectors 15 and 16 preliminarily connected to both the ends along the concave groove 13 of the rotating shaft 12 extremely simply. Moreover, the wiring device is capable of preventing the cable 14 from springing out of the concave groove 13 with the inner ring 17d since the inner ring 17a rotates together with rotating shaft 12 and the cable 14 when the inner ring 17a of the radial bearing 17 is fitted pressedly over the outer circumference of the rotating shaft 12 after the cable 14 has been laid. Accordingly, the wiring device makes it possible to lay the cable 14 along a minimum space while concealing the cable 14 in the rotating shaft 12 and not to expose the cable 14 outside the joint mechanism 11. Furthermore, the wiring device is capable of enhancing strength of the rotating shaft 12 remarkably higher than that of a hollow shaft since the rotating shaft 12 does not need to be a hollow shaft and requires formation of only the concave groove 13 in the portion of the outer circumference.

In addition, means for preventing the cable 14 from springing out of the concave groove 13 of the rotating shaft 12 is not limited to the radial bearing 17 but may be a sleeve, a gear or another kind of ring like member which can be fitted over the outer circumference of the rotating shaft 12.

Figure 4:
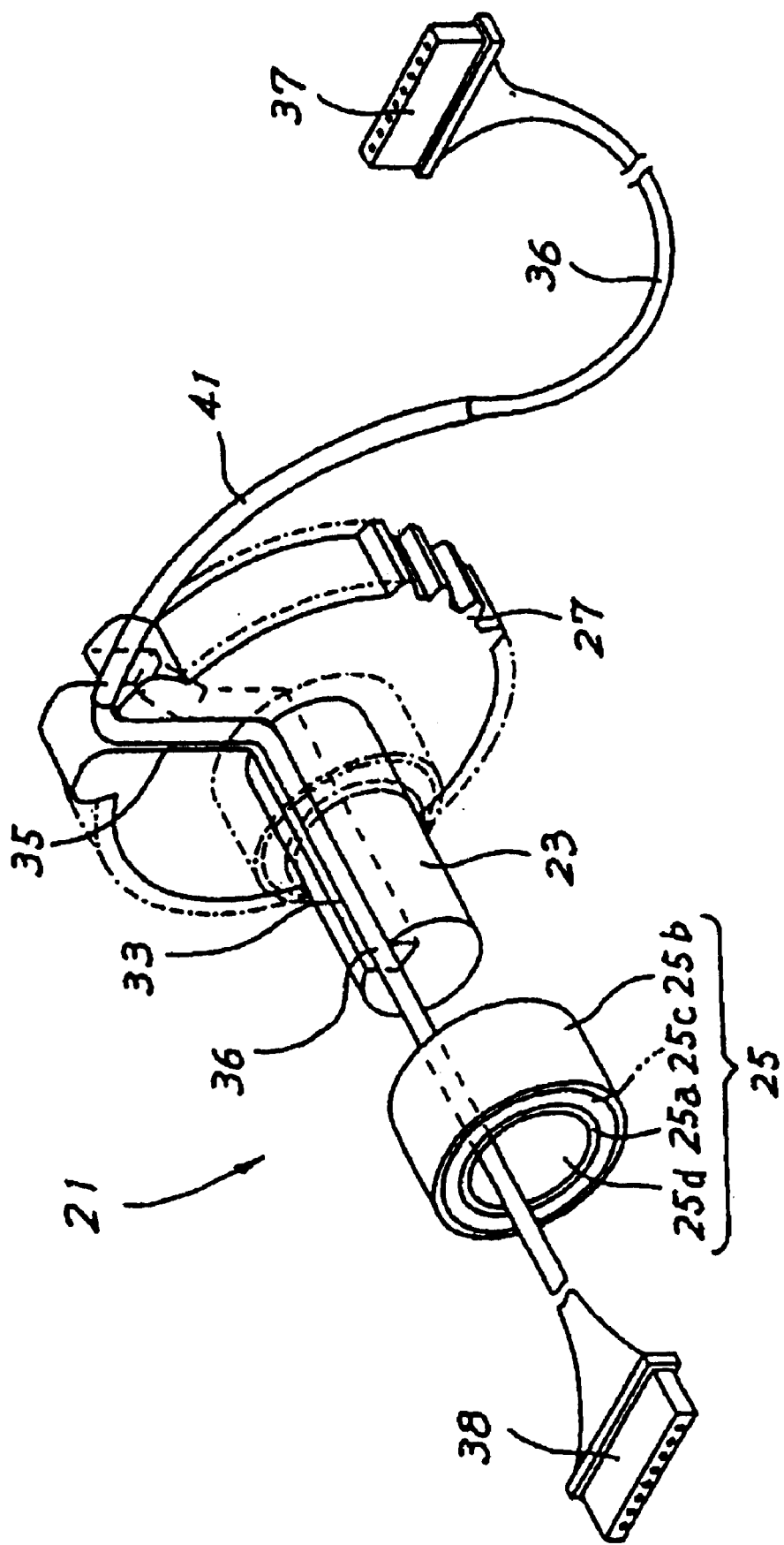
FIG. 4 is a perspective view showing main parts of an embodiment wherein the present invention is applied to a wiring device for joint mechanism of a leg member of a gressorial robot.
Figure 5:
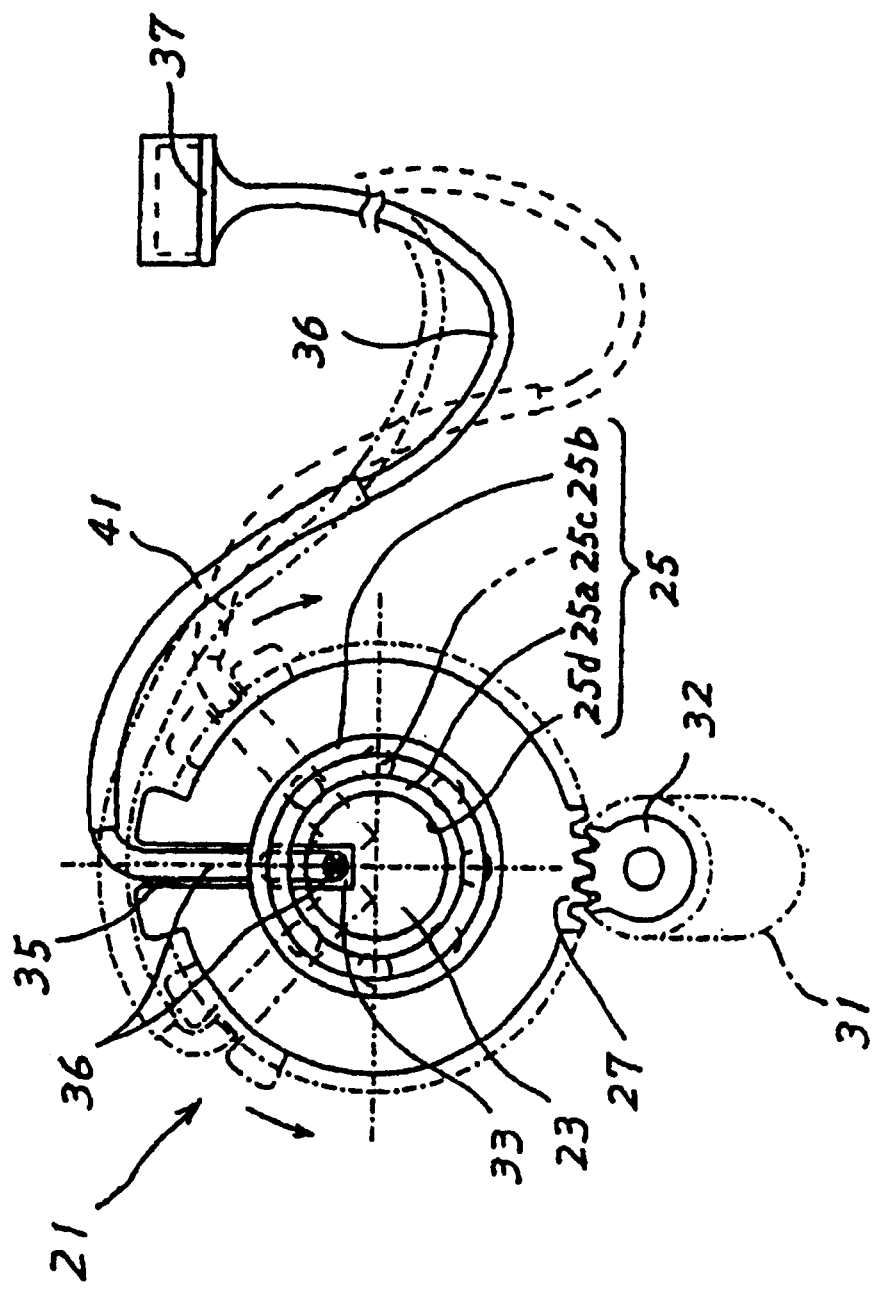
FIG. 5 is a front view of FIG. 4.

Describing with reference to FIGS. 4 through 6 a structure wherein the wiring device for the joint mechanism according to the present invention is applied to a part of a shoulder joint 7 of a leg member 5 of a gressorial robot 1 shown in FIG. 6, a joint mechanism 21 comprising an upper leg part 5a of the leg member 5 is coupled with a leg attaching member 22 to be attached to a body member 2 of the gressorial robot 1 so as to be rotable around two rotating shafts 23 and 24 which are disposed at a joint center and intersect perpendiculary. In this case, the wto rotating shafts 23 and 24 are rotatably attached to the leg attaching member 22 and the upper leg part 5a by way of a pair of radial bearing 25 and 26 such as a ball bearing respecitvely, and partrial gears 27 and 28 which are gears respectively formed integrally with outer circumferences of intermediate portions of the rotating shafts 23 and 24. A shaft fitting part 29 which is formed integrallt with a tooth-lock portion as a portion of an outer circumference of the partial gear 28 on a side of the upper leg part a is detachably fitted over a tip 23a of the rotating shft 23 on a side of the leg attaching member 22 from the axial direction and centers of these shaft fitting part 29 and 23a are detachably coupled with a screw 30 which runs from a direction perpendicular to the axial direction. The upper leg part 5a is configured to be rotatively dreiven relative to the leg attaching member 22 within a definite angle around the two rotating shafts 23 and 24 by rotatively driving the partial gears 27 and 28 of the two roting shafts 23 and 24 independetly with a driving gear 32 of an actuator 31 such as a geared motor which is attached to the leg attaching member 22 and the upper leg part 5a respectively.

In the wiring device for the joint mechanisms 21, first concave grooves 33 and 34 are formed in portions of outer circumferences of the two rotating shafts 23 and 24 along axial directions of these rotating shafts, and a second concave groove 35 is formed in a side surface of the partial gear 27 on a side of the leg attaching member 22 so as to have a radial shape which is connected to an end of the first concave groove 33 and ranges to an outer circumference of the partial gear 27, whereby the first concave groove 33 and the second concave groove 35 are formed in an L shape as a whole. In addition, these first concave grooves 33, 34 and second concave groove 35 are formed as the U groove 13a, the V groove 13b, cut surface 13c shown in FIGS. 3A through 3C or the like. A pair of connectors 37 have preliminarily been connected to both ends of a cable 36 which is a wiring material, the cable 36 is laid in and along the first concave grooves 33, 34 and the second concave groove 35 of the two rotating shafts 23, 24 and the partial gear 27, and the pair of connectors 37 and 38 at both the ends of the cable 36 are detachably connected to a pair of control circuits (not shown) built in the leg attaching member 22 and the upper leg part 5a respectively, whereby the pair of control circuits are electrically connected by way of the cable 36.

In this case, either of the connectors 37 and 38 at both the ends of the cable 36 is configured to pass through center holes 25d and 26d of inner rings 25a and 26a of radial bearings 25 and 26 which are to be pressedly fitted over the concave grooves 33 and 34 of the two rotating shafts 23 and 24, and the cable 36 is laid in and along the concave grooves 33, 34 and 35 of the two rotating shafts 23 and 24 by inserting the cable 36 through center holes 25d and 26d as described with reference to the principle of wiring device shown in FIGS. 1 and 2. The inner rings 25a and 26a of the radial bearings 25 and 26 are pressedly fitted over the concave grooves 33 and 34 of the two rotating shafts 23 and 24, and outer rings 25b and 26b are pressedly fitted or set into bearing attaching holes 39 of the leg attaching member 22 and the upper leg part 5a, whereby the two rotating shafts 23 and 24 are rotatably attached to the leg attaching member 22 and the upper leg part 5a.

Accordingly, the wiring device allows the cable 36 which has the pair of connectors 37 and 38 preliminarily connected to both the ends to be easily laid in and along the concave grooves 33, 34 and 35 in the outer circumferences of the two rotating shafts 23, 24 and the side surface of the partial gear 27. The wiring device is capable of preventing the cable 36 from springing out of the concave grooves 33 and 34 with the inner rings 25a and 26a of the radial bearings 25 and 26, and laying the cable 36 within a minimum space while concealing the cable 36 in the rotating shafts 23 and 24. Moreover, as shown in FIG. 5, the cable 36 laid in the concave grooves 33 and 35 is rotated around the center of the rotating shaft 23 together with the rotating shaft 23, the inner ring 25a of the radial bearing 25 and the partial gear 27 when the rotating shaft 23 rotates clockwise and counterclockwise within the definite angle, whereby the wiring device is capable of completely preventing the cable 36 from being injured due to rubbing with the rotating shaft 23, the inner ring 25a or the partial gear 27 and remarkably prolonging a service life of the cable 36 although there occurs some twisting at both ends of the cable 36.

Since the rotating shafts 23 and 24 do not need to be hollow shafts but require only formation of the concave grooves 33 and 34 in the portions of their outer circumferences, the rotating shafts 23 and 24 can have sufficient strength and allow an angle sensor 40 or the like to be coaxially mounted at the playing end 23a of the rotating shaft 23 (and the rotating shaft 24) as shown in FIG. 6 to configure the joint mechanism 21 compact.

Since the cable 36 is pulled outside the outer circumference of the partial gear 27 as shown in FIG. 5, the cable 36 swung away in a wide space between the partial gear 27 and the connector 37 is liable to be twisted around another mechanical part when the partial gear 27 is rotated clockwise and counterclockwise within the definite angle.

Therefore, the wiring device maintains the cable 36 pulled outside the outer circumference of the partial gear 27 in a shape preliminarily curved along the outer circumference of the partial gear 27 with a tube material 41 which is curved shape maintaining means. When the cable 36 is maintained in the shape curved along the outer circumference of the partial gear 27 as described above, the cable 36 is allowed to move within a minimum space along the outer circumference of the partial gear 27 when the partial gear 27 is rotated clockwise and counterclockwise, whereby the wiring device is capable of preventing a risk of the cable 36 to be twisted around the other mechanical part, assuring high security and saving a space for the wiring device by reducing a movable space for the cable 36. In addition, usable as the tube material 41 is a metal material such as aluminium, a thermoplastic synthetic resin material such as vinyl chloride or the like.

While the embodiment of the present invention has been described above, the present invention is not limited by the embodiment described above and may be modified in various ways on the basis of a technical concept of the present invention.

INDUSTRIAL APPLICABILITY

The present invention is applicable as a wiring device for joint mechanisms of gressorial robots.

What is claimed is:

1. A rotary bearing device comprising a rotating shaft and a bearing for supporting said rotating shaft wherein said rotating shaft has a concave groove formed in an axial direction of a portion of an outer circumference thereof; wiring material laid in and along said concave groove of said rotating shaft; and wherein said bearing covers said rotating shaft such that said wiring material laid in said concave groove is not exposed, whereby said bearing is in the form of a radial bearing including an inner ring fitted over said rotating shaft which rotates together with said rotating shaft and said wiring material so that the wiring material is not exposed and an outer ring for applying a radial force for rotationally supporting said rotating shaft.

2. A joint device having a rotating shaft and a bearing for supporting said rotating shaft wherein a concave groove is formed in an axial direction of a portion of an outer circumference of said rotating shaft; wiring material laid in and along said concave groove of said rotating shaft; and wherein said bearing covers said rotating shaft such that said wiring material laid in said concave groove is not exposed, whereby said bearing is in the form of a radial bearing including an inner ring fitted over said rotating shaft which rotates together with said rotating shaft and said wiring material so that the wiring material is not exposed and an outer ring for applying a radial force for rotationally supporting said rotating shaft.

3. A joint device comprising a rotating shaft having a concave groove formed in an axial direction of a portion of an outer circumference thereof, a wiring material laid in and along the concave groove of said rotating shaft, and a ring-like member which is fitted over the outer circumference of said rotating shaft for covering said rotating shaft and for supporting said rotating shaft such that said wiring material laid in said concave groove is not exposed, whereby said ring like member is in the form of a radial bearing including an inner ring fitted over said rotating shaft which rotates together with said rotating shaft and said wiring material so that the wiring material is not exposed and an outer ring for applying a radial force for rotationally supporting said rotating shaft.

4. A joint device comprising a rotating shaft and a bearing for covering an outer circumference of the rotating shaft and wherein a concave groove is formed in an axial direction of a portion of the outer circumference of said rotating shaft, a wiring material is laid in and along the concave groove of said rotating shaft, and whereby said bearing is in the form of a radial bearing including an inner ring fitted over the outer circumference of said rotating shaft which rotates together with said rotating shaft and said wiring material so that said wiring material laid in said concave groove is not exposed, and an outer ring for applying a radial force for rotationally supporting said rotating shaft.

5. A joint device comprising a rotating shaft, and a wiring material being laid in an axial direction of said rotating shaft and having a pair of connectors connected to both ends thereof wherein a concave groove is formed in an axial direction of a portion of an outer circumference of said rotating shaft, said wiring material being laid in the concave groove of said rotating shaft in a condition where either of the connectors of said wiring material is inserted through a center hole of a ring-like member, and wherein said ring-like member is in the form of a radial bearing including an inner ring which is fitted over the outer circumference of said rotating shaft which rotates together with said rotating shaft and said wiring material so that said wiring material laid in said concave groove is not exposed and an outer ring for applying a radial force for rotationally supporting said rotating shaft.

6. A joint mechanism comprising a rotating shaft, a gear formed at an end of the rotating shaft and a bearing in the form of a radial bearing having an inner ring covering an outer circumference of said rotating shaft and rotationally supporting said rotating shaft, said rotating shaft including an L-shaped concave groove having a first concave groove which is formed in an axial direction of a portion of the outer circumference of said rotating shaft and a second concave groove which is connected to an end of the first concave groove and radially extends from a side surface of said gear to an outer circumference thereof, a wiring material being laid in and along said L-shaped concave groove, and wherein an inner ring of said bearing is fitted over the outer circumference of said rotating shaft so that said wiring material laid in said concave groove is not exposed.

7. The joint mechanism according to claim 6, wherein said wiring material is passed through said second concave groove and is pulled outside the outer circumference of said gear to be maintained in a curved shape along the outer circumference of said gear by curved shape maintaining means.

8. The joint mechanism according to claim 7, wherein said curved shape maintaining means is composed of a tube material.

9. A robot characterized by using, in a joint part of the body, the rotary bearing device according to claim 1.

* * * * *